United States Patent [19]
Castelli et al.

[11] Patent Number: 5,467,171
[45] Date of Patent: Nov. 14, 1995

[54] COMPACT ACTIVE STEERING ROLL FOR BELT LOOPS

[75] Inventors: Vittorio Castelli, Yorktown Heights, N.Y.; Stephen T. Chai, Rancho Palos Verde, Calif.

[73] Assignee: Xerox Corporation, Stamford, Conn.

[21] Appl. No.: 122,085

[22] Filed: Sep. 17, 1993

[51] Int. Cl.$^6$ ........................................ G03G 5/00
[52] U.S. Cl. .................... 355/212; 198/806; 355/207; 474/102
[58] Field of Search ........................ 355/210, 272, 355/211, 275, 212, 207, 208, 203, 204, 282; 198/807, 806; 346/160; 474/102–108

[56] References Cited

U.S. PATENT DOCUMENTS

| | | | |
|---|---|---|---|
| 4,061,222 | 12/1977 | Rushing | 198/807 |
| 4,170,175 | 10/1979 | Conlon | 355/212 X |
| 4,174,171 | 11/1979 | Hamaker et al. | 355/212 |
| 4,196,803 | 4/1980 | Lovett | 198/806 |
| 4,344,693 | 8/1982 | Hamaker | 355/212 |
| 4,552,295 | 11/1985 | Smith et al. | 198/807 X |
| 4,572,417 | 2/1986 | Joseph et al. | 198/807 |
| 4,961,089 | 10/1990 | Jamzadeh | 355/207 |
| 5,078,263 | 1/1992 | Thompson et al. | 198/807 |
| 5,157,444 | 10/1992 | Mori et al. | 355/282 |
| 5,394,222 | 2/1995 | Genovese | 355/212 X |
| 5,410,389 | 4/1995 | Poehlein | 355/212 |

Primary Examiner—A. T. Grimley
Assistant Examiner—Shuk Y. Lee
Attorney, Agent, or Firm—Kevin R. Kepner

[57] ABSTRACT

An apparatus for steering a moving web, particularly in an electrophotographic printing machine of the type having an endless photoreceptor belt supported by a plurality of rolls and arranged to move in a predetermined path through a plurality of processing stations disposed therealong the web being of the type which is supported by a plurality of rolls. A web steering roll for supporting the web being adapted for rotational movement about a first axis and tilting movement about a second axis transverse to the first axis is used. A compact internal tilting mechanism utilizing a motor inside of the roll connected at one end to a first pin extending outwardly from one end of said steering roll, the first pin being positioned eccentrically of the rotary axis, and a second pin extending outwardly at the other end of the roll also positioned eccentrically of the rotary axis and connected to the motor through a connecting mechanism so that when said motor is actuated the second pin rotates in a direction opposed to that of the first pin. The pins are supported in substantially parallel guides so that the movement of the roll is limited to one plane. A belt edge sensor can be utilized to track the position of the belt and feed that information to the machine controller which then actuates the steering motor to tilt the roll to the extent and for as long as is necessary to maintain the proper belt tracking pattern on the roll.

10 Claims, 3 Drawing Sheets

COMPACT ACTIVE STEERING ROLL FOR BELT LOOPS

This invention relates generally to a system belt steering, and more particularly concerns a compact device steer a belt to maintain proper belt tracking characteristics.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

Many commercial applications of the above process employ a photoconductive member in the form of a belt which is supported about a predetermined path past a plurality of processing stations to ultimately form a reproduced image on copy paper. The location of the latent image recorded on the photoconductive belt must be precisely defined in order to have the various processing stations acting thereon optimize copy quality. To this end, it is critical that the lateral alignment of the photoconductive belt be controlled within prescribed tolerances. Only in this manner will a photoconductive belt move through a predetermined path so that the processing stations disposed thereabout will be located precisely relative to the latent image recorded thereon. Lateral movement of the photoconductive belt is particularly a problem in connection with color copiers where the precise tracking of the belt is mandatory for acceptable copy quality.

When considering control of the lateral movement of the belt, it is well known that if the belt were perfectly constructed and entrained about perfectly cylindrical rollers mounted and secured in an exactly parallel relationship with one another, there would be no lateral movement of the belt. In actual practice, however, this is not feasible. Due to the imperfections in the system's geometry, the belt velocity vector is not normal to the roller axis of the rotation, and the belt will move laterally relative to a roller until reaching a kinematically stable position.

Existing methods of controlling the lateral movement of a belt comprise servo systems, crowned rollers and flanged rollers. Servo systems use steering rollers to maintain lateral control of the belt. While they generally apply less stress to the sides of the belt than do crowned rollers and flanged rollers, servo systems are frequently rather complex, costly and require a large space within the machine. Crowned and flanged rollers while being inexpensive, frequently produce high local stresses resulting in damage to the edges of the belt.

Accordingly, it is desirable to develop a belt steering system that is relatively simple and compact yet avoids the high localized stresses of crowned and flanged rollers.

The following disclosures may be relevant to various aspects of the present invention:

U.S. Pat. No. 4,061,222 Inventor: Rushing Issue Date:Dec. 6, 1977

U.S. Pat. No. 4,572,417 Inventor: Joseph et al. Issue Date: Feb. 25, 1986

U.S. Pat. No. 4,170,175 Inventor: Conlon, Jr. Issue Date: Oct. 9, 1979

U.S. Pat. No. 4,174,171 Inventor: Hamaker et ano. Issue Date:Nov. 13, 1979

U.S. Pat. No. 4,344,693 Inventor: Hamaker Issue Date:Aug. 17, 1982

U.S. Pat. No. 4,961,089 Inventor: Jamzadeh Issue Date: Oct. 2, 1990

U.S. Pat. No. 5,078,263 Inventor: Thompson et al. Issue Date: Jan. 7, 1992

The relevant portions of the foregoing disclosures may be briefly summarized as follows:

U.S. Pat. No. 4,061,222 to Rushing discloses an apparatus for tracking an endless belt along an endless path by a tiltable belt steering roller whose position is continually adjusted so that the belt is maintained at a stable equilibrium position despite changes in the belt shape. The adjustment is determined by control circuitry which produces signals representative of lateral belt edge position, a desired belt edge position, and either a steering roller position or an instantaneous lateral belt deviation rate to produce a control signal which is applied to a gear motor to control the tilt angle of the steering belt roller. This apparatus utilizes the absolute control method.

U.S. Pat. No. 4,572,417 to Joseph et al. discloses an apparatus for controlling lateral, cross track alignment of a web moving along a path to minimize lateral deviation between successive discrete areas of the web. A steering roller supports the web for movement along the path and is rotatable about an axis perpendicular to a plane of the span of the web approaching the steering roller.

U.S. Pat. No. 4,170,175 to Conlon, Jr. discloses a system for tracking an endless belt which automatically compensates for creep of the belt. The belt is supported by four rollers. A first is a drive roller, a second and third are idler rollers, and a fourth roller is an idler roller with flared ends. The flared roller provides passive tracking without electronic or active feedback. One of the idler rollers is spring loaded such that when an edge of the belt creeps up on one of the flared ends of the fourth roller, that side of the spring loaded roller is caused to tilt due to increased belt stiffness on that side. This positions the belt laterally toward a central position.

U.S. Pat. No. 4,174,171 to Hamaker et ano. disclose an apparatus for controlling the lateral alignment of a moving photoconductive belt. A resilient support constrains lateral movement of the belt causing a moment to be applied to a pivotably mounted steering post. As a result, the steering post pivots in a direction to restore the belt along a predetermined path. This apparatus is passive and provides no active electronic feedback.

U.S. Pat. No. 4,344,693 to Hamaker disclose an apparatus for controlling the lateral alignment of a moving photoconductive belt. Lateral movement of the belt causes a frictional force to be applied to the belt support. The frictional force tilts the belt support to restore the belt to the predetermined path of movement. This apparatus is passive and provides no active electronic feedback.

U.S. Pat. No. 4,961,089 to Jamzadeh discloses a method and apparatus for controlling lateral movement of a web along an endless path. The lateral position of the web is monitored and a determination is made by a control unit if the web is within predetermined limits such that a copying operation can be completed while the web is still properly tracking. If the web is not tracking properly, or if it is predicted that the web will track beyond its predetermined lateral limits within a copying operation, a correcting step is taken prior to the copying operation. The correcting step determines a tilt angle for a steering roller. Upon completion of the correcting step, the apparatus returns to a monitoring capacity and does not provide corrective measures until the web is beyond or is predicted to go beyond the predetermined limits during a subsequent copying operation. This insures that copying operations have proper registration and do not include corrective steps during the copying operation which might interfere with the registration. This apparatus uses an absolute scheme to determine corrective action.

U.S. Pat. No. 5,078,263 to Thompson et al. discloses an active steering method that introduces corrective skew through a small rotation about the "soft-axis" of one or more idler rolls. The skew is introduced by an external connection to a servo-motor to alter the angle at which the web enters or leaves the roll to cause the web to walk along the roll.

In accordance with one aspect of the present invention, there is provided an apparatus for controlling a web moving along a predetermined path. The apparatus includes a web steering roll for supporting the web, the web steering roll being adapted for rotational movement about a first axis and tilting movement about a second axis transverse to the first axis and means for sensing movement of the web in a direction substantially normal to the predetermined path and generating a signal indicative thereof. Means, responsive to the signal generated by the sensing and generating means, for tilting the steering roll about the second axis, to return the web to the predetermined path, the tilting means being disposed internally within the steering roll is also provided.

Pursuant to another aspect of the present invention, there is provided an electrophotographic printing machine of the type having an endless photoreceptor belt supported by a plurality of rolls and arranged to move in a predetermined path through a plurality of processing stations disposed therealong. The improvement includes a belt steering roll for supporting the belt, the belt steering roll being adapted for rotational movement about a first axis and tilting movement about a second axis transverse to the first axis and means for sensing movement of the belt in a direction substantially normal to the predetermined path and generating a signal indicative thereof. Means, responsive to the signal generated by the sensing and generating means, for tilting the steering roll about the second axis, to return the belt to the predetermined path, the tilting means being disposed internally within the steering roll is also provided.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 4:
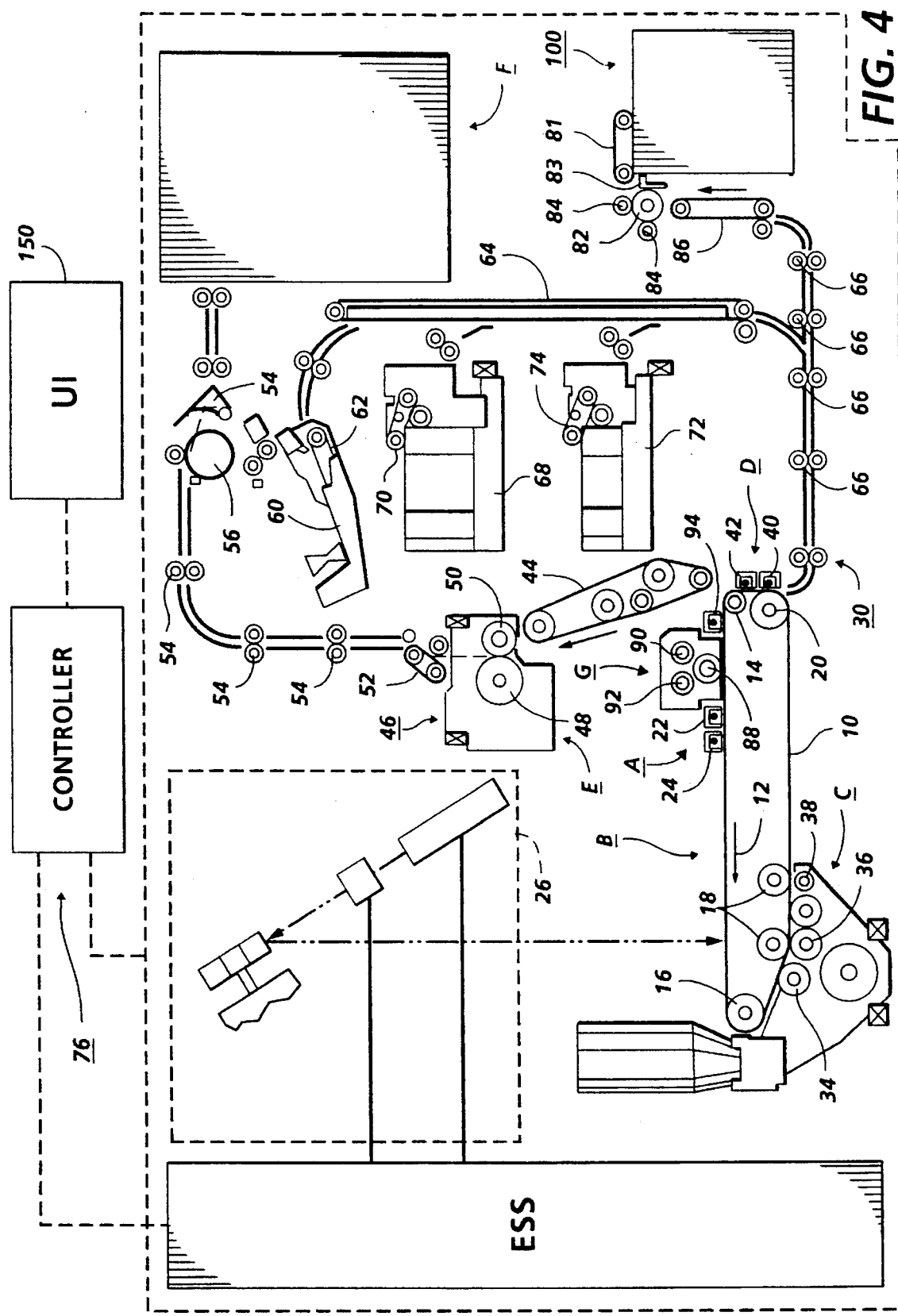
FIG. 4 is a schematic elevational view of an electrophotographic printing machine incorporating the FIG. 1 system therein.

For a general understanding of the features of the present invention, reference is made to the drawings. In the drawings, like reference numerals have been used throughout to identify identical elements. FIG. 4 schematically depicts a monochromatic electrophotographic printing machine incorporating the features of the present invention therein. It will become evident from the following discussion that the system to extend fuser roll life of the present invention may be employed in a wide variety of devices including full process color and highlight color printing machines and is not specifically limited in its application to the particular embodiment depicted herein.

Referring to FIG. 4 of the drawings, the electrophotographic printing machine employs a photoconductive or an electro-receptive belt 10. The preferred photoconductive belt will be described. The photoconductive belt 10 is made from a photoconductive material coated on a ground layer, which, in turn, is coated on an anti-curl backing layer. The photoconductive material is made from a transport layer coated on a selenium generator layer. The transport layer transports positive charges from the generator layer. The generator layer is coated on an interface layer. The interface layer is coated on the ground layer made from a titanium coated Mylar™. The interface layer aids in the transfer of electrons to the ground layer. The ground layer is very thin and allows light to pass therethrough. Other suitable photoconductive materials, ground layers, and anti-curl backing layers may also be employed. Belt 10 moves in the direction of arrow 12 to advance successive portions sequentially through the various processing stations disposed about the path of movement thereof. Belt 10 is entrained about stripping roller 14, tensioning roller 16, idler roll 18 and drive roller 20. Stripping roller 14 and idler roller 18 are mounted rotatably so as to rotate with belt 10. Tensioning roller 16 is resiliently urged against belt 10 to maintain belt 10 under the desired tension. Tensioning roller 16 further contains the steering system of the present invention, discussed in greater detail below,. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At the imaging station, an imaging module indicated generally by the reference numeral 26, records an electrostatic latent image on the photoconductive surface of the belt 10. Imaging module 26 includes a raster output scanner (ROS). The ROS lays out the electrostatic latent image in a series of horizontal scan lines with each line having a specified number of pixels per inch. Other types of imaging systems may also be used employing, for example, a pivoting or shiftable LED write bar or projection LCD (liquid crystal display) or other electro-optic display as the "write" source.

Electrophotographic printing machines have increasingly utilized digital electronics technology to produce output copies from input video data representing original image information. In this case, it is known to use a raster output scanner (ROS) for exposing the charged portions of the photoconductive member to record the electrostatic latent image thereon. Generally, the ROS has a laser for generating a collimated beam of monochromatic radiation. The laser beam is modulated in conformance with the image information and is directed toward the surface of the photoconductive member through an optics system to form the desired image on the photoconductive member. In the optics system, the modulated laser beam is reflected through a lens onto a scanning element, typically a rotating polygon having mirrored facets such that the light beam is reflected from a facet and thereafter focused to a "spot" on the photoconductive member. The rotation of the polygon causes the spot to scan linearly across the photoconductive member in a fast scan (i.e., scan line) direction. Meanwhile, the photoconductive member is advanced in a process direction orthogonal to the scan line direction and relatively more slowly than the rate of the fast scan, the so-called slow scan direction. In this manner, the modulated laser beam is scanned across the recording medium in a raster scanning pattern. The light beam is intensity-modulated in accordance with an input image serial data stream at a rate such that individual picture elements ("pixels") of the image represented by the data stream are exposed on the photosensitive medium to form the latent image. As a result of the ability to precisely control the ROS, the image can be exposed on the photosensitive medium in a varying number of positions laterally with respect to the process direction.

Here, the imaging module 26 (ROS) includes a laser 110 for generating a collimated beam of monochromatic radiation 120, an electronic subsystem (ESS), located in the machine electronic printing controller 100 that transmits a set of signals via 114 corresponding to a series of pixels to the laser 110 and/or modulator 112, a modulator and beam shaping optics unit 112, which modulates the beam 120 in accordance with the image information received from the ESS, and a rotatable polygon 118 having mirror facets for sweep deflecting the beam 122 into raster scan lines which sequentially expose the surface of the belt 10 at imaging station B.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. A magnetic roll, positioned after developer roll 38, in the direction of arrow 12 is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pretransfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 11:). Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. The sheets are attached to one another by either a binder or a stapler. In either case, a plurality of sets of documents are formed in finishing station F. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from the secondary tray 68. The secondary tray 68 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D.

Copy sheets may also be fed to transfer station D from the auxiliary tray 72. The auxiliary tray 72 includes an elevator driven by a directional AC motor. Its controller has the ability to drive the tray up or down. When the tray is in the down position, stacks of copy sheets are loaded thereon or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 66 and then to transfer station D.

Secondary tray 68 and auxiliary tray 72 are secondary sources of copy sheets. The high capacity variable sheet size sheet feeder of the present invention, indicated generally by the reference numeral 100, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the rear of cleaning station G.

The various machine functions are regulated by a controller 76. The controller 76 is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets. In addition, the controller regulates the various positions of the gates depending upon the mode of operation selected. Thus, when the operator selects the finishing mode, either an adhesive binding apparatus and/or a stapling apparatus will be energized and the gates will be oriented so as to advance either the simplex or duplex copy sheets to finishing station F.

Figure 1:
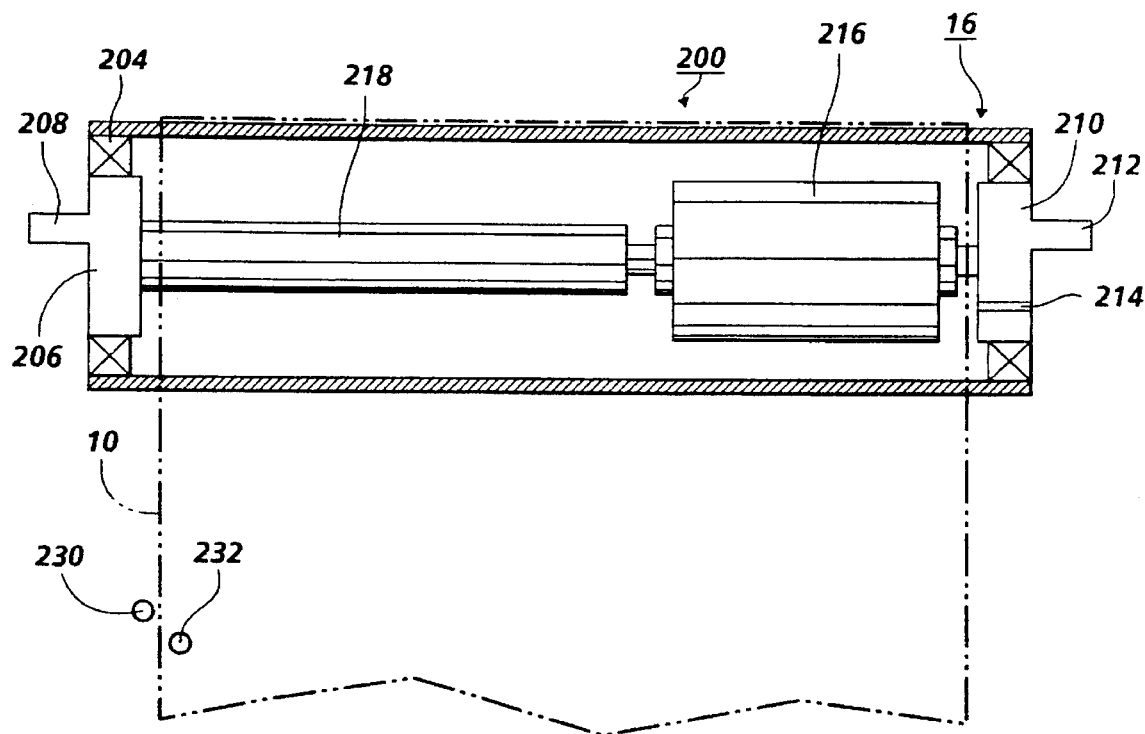
FIG. 1 is a partial sectional top view normal to the axis of the steering/tensioning roll of the compact active steering system.

Turning now to FIG. 1, a partial cross sectional top view of the steering system is shown. The steering system 16 is made up of a roll 200 which is a cylindrical member 202 supported on each end by a bearing 204. Each bearing 204 is mounted on a disk which has an eccentric pin on the outside face. One of the disks 210 is rigidly connected to the stator of a small motor 216 which may be a gear motor and the other disk 206 is rigidly connected to the rotor of the same motor 216 or the output shaft of the gear motor. The motor 216 is located inside of the steering roll 16. An opening 214 is provided in one of the disks 210 through which the necessary electrical connections can be made to the motor 216.

In operation, the actuation of the motor causes the two disks 206, 210 to rotate in opposite directions to cause the pins 208, 212 to be in out-of-phase positions. The pins 208, 212 are supported in blocks 209, 213 mounted slidably in guides 220, 221 which are in the same direction at a slight angle to the bisect of the wrap angle of the belt on roll 200, the guides being mounted on the machine framework 250. Accordingly, when the pins 208, 212 are moved to an out-of-phase position, the roll 200 is caused to tilt, causing the belt 10 to move laterally or "walk" on the roll 200 in one direction or the other depending on the tilt of the roll and the direction of belt motion. In order to restrict the articulation to the soft axis, the roll must be loaded by springs 222 or other biasing devices and the resulting bias force due to the slight angle will pre-load the block against the guide to eliminate clearance between the blocks 209, 213 and the guides 220,221. Accordingly, this steering roll 16 also works as a tensioning roll.

Figure 2:
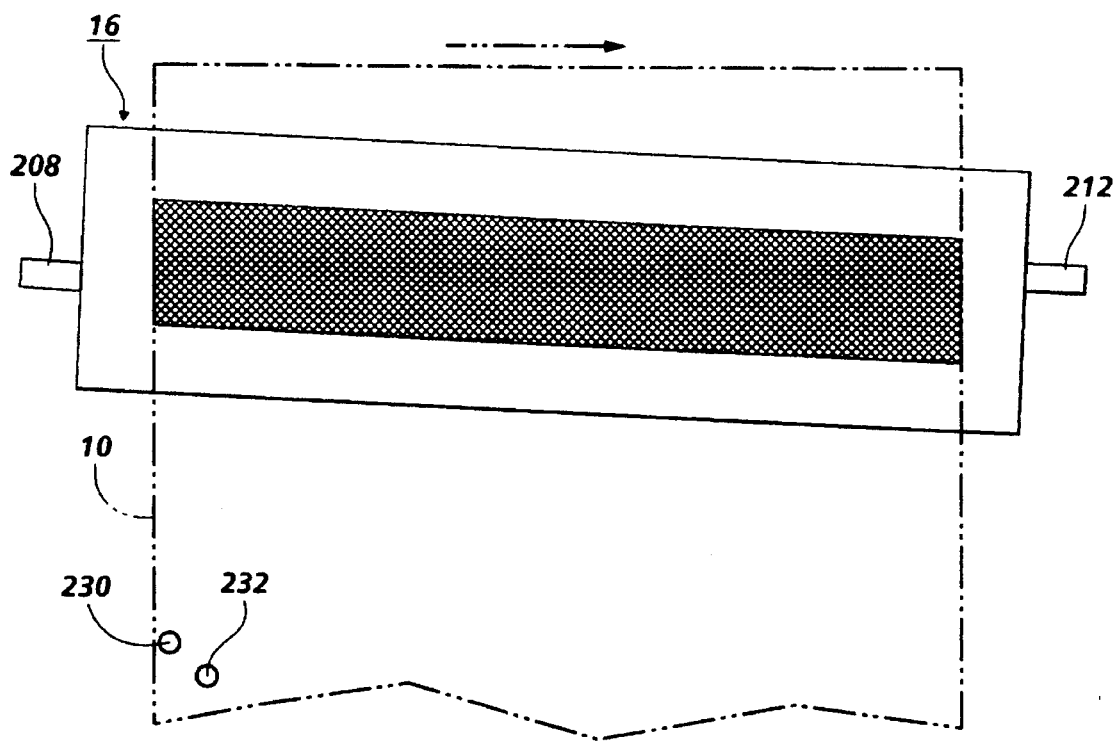
FIG. 2 is an end view of the steering/tensioning roll of the compact active steering system of FIG. 1 illustrating the steering/tensioning roll of the compact active steering system in a tilted position and showing the contact area of the belt with the roll for a wrap angle of less than 180°.

FIG. 2 illustrates the contact area of the roll and belt when the wrap angle is less than 180°. The shaded area represents the contact area between the belt and roll.

Figure 3:
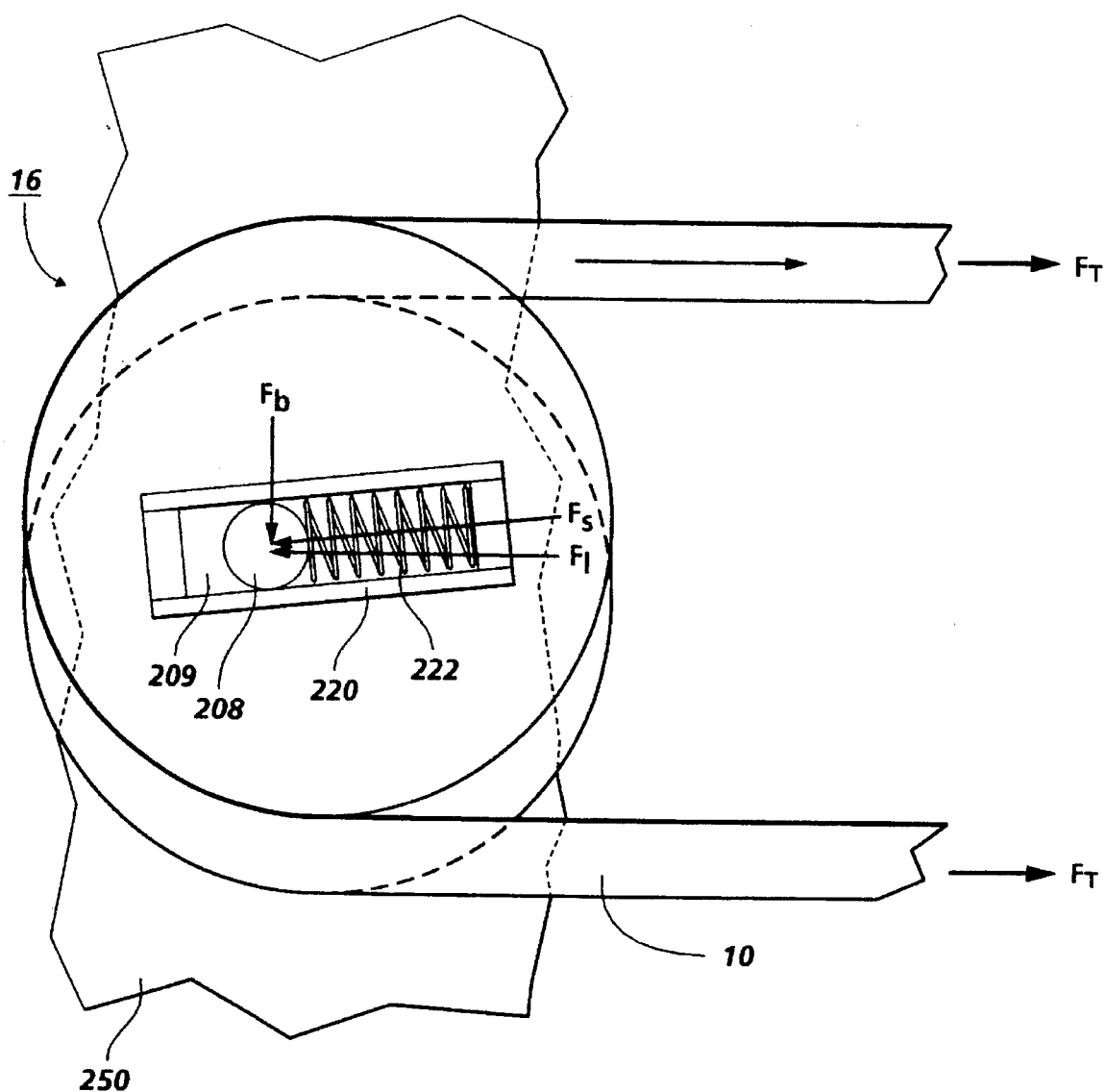
FIG. 3 is an enlarged, fragmentary elevational view of the steering/tensioning roll of the compact active steering system of FIG. 1 for a belt wrap angle of 180° further illustrating the tensioning device.

To function properly as a steering roll, backlash must be virtually eliminated. The two main sources of backlash are clearance between the eccentric pins and guides and clearance in the motor gears. By loading the pins at a slight angle against the guide, as illustrated in FIG. 3, the backlash associated with the clearances between the pins and the guides can be eliminated to the extent required. The backlash associated with the motor gear clearance is not a problem as it can be eliminated with a mechanical pre-load force. However, when the pins are at their minimum phase difference, backlash must be eliminated by specification of close tolerances within the gear system. Additionally, the mechanism inside of the steering roll can be designed with stops which limit the relative rotation to an acceptable angle such as 90 degrees. This angle can be adjusted by positioning the stops so that the criteria of a particular system can be met.

FIG. 3 also illustrates the forces exerted on the roll and which must be balanced to maintain an equilibrium position. The belt tension forces $F_t$ are balanced by the $F_t$ component of the spring force $F_s$. The $F_b$ component of the spring force is the bias force causing the pin support blocks 209, 213 to load against the guides 220, 221 to eliminate clearance.

A belt edge sensor 230 or plurality of sensors 230, 232 (FIGS. 1 and 2) can then be utilized to track the position of the belt 10 and emit a signal indicative of the belt position to the machine controller 76. The controller 76, which is typically a microprocessor can then interpret the position and send actuation signals to the motor 216 to control the degree and the duration of tilt necessary to maintain the proper belt track. As is well known, if the tracking errors are cyclical with respect to the belt rotations, a profile of the belt edge can be generated and memorized by the microprocessor and the above compact steering mechanism can control the belt with a high degree of accuracy.

It is also possible to perform the belt steering by rotating only an eccentric at one end of the steering roll. This embodiment will lead to a reduction of the somewhat uncertain angular position of the roll about an axis passing through the eccentric pins that results from rotating both eccentrics simultaneously. The negative consequence of this action is that the steering angle is obtained by motion of only one end of the steering roll and a larger degree of motion will be required to obtain the same belt walk rate.

In recapitulation, there is provided a compact steering system for an endless loop belt which utilizes a steering roll mounted on disks having eccentric pins thereon. The opposed disks are connected respectively to the stator and rotor of an electric motor so that rotation of the motor causes the eccentric pins to be moved to an out of phase position. Substantially parallel pin guides on the machine framework cause the out of phase rotation of the pins to tilt the roll about a soft axis causing the moving belt to "walk" laterally across the roll. Belt edge sensors emit a signal indicative of belt position to a controller which then actuates the motor as necessary to maintain the proper belt tracking path. The entire mechanics for the steering system is located internal to the steering roll providing a very compact design.

It is, therefore, apparent that there has been provided in accordance with the present invention, a compact steering system for an endless loop belt that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for controlling a web moving along a predetermined path, including:

a web steering roll for supporting said web, said web steering roll being adapted for rotational movement about a first axis and tilting movement about a second axis transverse to the first axis;

means for sensing movement of the web in a direction substantially normal to the predetermined path and generating a signal indicative thereof; and means, responsive to the signal generated by said sensing and generating means, for tilting said steering roll about the second axis, to return the web to the predetermined path, said tilting means being disposed internally within said steering roll.

2. An apparatus as claimed in claim 1, in which said tilting means includes:

means for displacing an end of said steering roll in a direction substantially perpendicular to the first axis; and means, connected to said displacing means, for actuating said displacing means, responsive to the signal from said sensing and generating means.

3. An apparatus for controlling a web moving along a predetermined path, including:

a web steering roll for supporting said web, said web steering roll being adapted for rotational movement about a first axis and tilting movement about a second axis transverse to the first axis;

means for sensing movement of the web in a direction substantially normal to the predetermined path and generating a signal indicative thereof;

means, responsive to the signal generated by said sensing and generating means, for tilting said steering roll about the second axis, to return the web to the predetermined path, said tilting means being disposed internally within said steering roll, said tilting means comprising means for displacing an end of said steering roll in a direction substantially perpendicular to the first axis; and means, connected to said displacing means, for actuating said displacing means, responsive to the signal from said sensing and generating means, said displacing means including a first pin extending outwardly from one end of said steering roll, said first pin being positioned eccentrically of the first axis and connected to said actuating means, a connecting member attached to said actuating means and a second pin extending outwardly from the other end of said steering roll, said second pin being positioned eccentrically of the first axis, said second pin, attached to said connecting member, being adapted to rotate in a direction opposed to that of said first pin in response to said actuating means being actuated.

4. An apparatus as claimed in claim 3, in which said actuating means includes a motor mounted internal to said steering roll, coupled to said first pin with said motor being adapted to rotate said first pin and said connecting member incrementally in opposite directions in response to the signal from said sensing and generating means.

5. An apparatus for controlling a web moving along a predetermined path, including:

a web steering roll for supporting said web, said web steering roll being adapted for rotational movement about a first axis and tilting movement about a second axis transverse to the first axis;

means for sensing movement of the web in a direction substantially normal to the predetermined path and generating a signal indicative thereof;

means, responsive to the signal generated by said sensing and generating means, for tilting said steering roll about the second axis, to return the web to the predetermined path, said tilting means being disposed internally within said steering roll, said tilting means comprising means for displacing an end of said steering roll in a direction substantially perpendicular to the first axis;

means, connected to said displacing means, for actuating said displacing means, responsive to the signal from said sensing and generating means, said displacing means including a first pin extending outwardly from one end of said steering roll, said first pin being positioned eccentrically of the first axis and connected to said actuating means, a connecting member attached to said actuating means and a second pin extending outwardly from the other end of said steering roll, said second pin being positioned eccentrically of the first axis, said second pin, attached to said connecting member, being adapted to rotate in a direction opposed to that of said first pin in response to said actuating means being actuated, said actuating means including a motor mounted internal to said steering roll, coupled to said first pin with said motor being adapted to rotate said first pin and said connecting member incrementally in opposite directions in response to the signal from said sensing and generating means;

a first guide supporting said first pin and limiting the movement of said first pin along a first path; and a second guide supporting said second pin and limiting the movement of said second pin to a second path substantially parallel to the first path.

6. An electrophotographic printing machine of the type having an endless photoreceptor belt supported by a plurality of rolls and arranged to move in a predetermined path through a plurality of processing stations disposed thereal-ong, including:

a belt steering roll for supporting said belt, said belt steering roll being adapted for rotational movement about a first axis and tilting movement about a second axis transverse to the first axis;

means for sensing movement of the belt in a direction substantially normal to the predetermined path and generating a signal indicative thereof; and means, responsive to the signal generated by said sensing and generating means, for tilting said steering roll about the second axis, to return the belt to the predetermined path, said tilting means being disposed internally within said steering roll.

7. A printing machine as claimed in claim 6, in which said tilting means includes:

means for displacing an end of said steering roll in a direction substantially perpendicular to the first axis; and means, connected to said displacing means, for actuating said displacing means, responsive to the signal from said sensing and generating means.

8. An electrophotographic printing machine of the type having an endless photoreceptor belt supported by a plurality of rolls and arranged to move in a predetermined path through a plurality of processing stations disposed therealong, including:

a belt steering roll for supporting said belt, said belt steering roll being adapted for rotational movement about a first axis and tilting movement about a second axis transverse to the first axis;

means for sensing movement of the belt in a direction substantially normal to the predetermined path and generating a signal indicative thereof;

means, responsive to the signal generated by said sensing and generating means, for tilting said steering roll about the second axis, to return the belt to the predetermined path, said tilting means being disposed internally within said steering roll and comprising means for displacing an end of said steering roll in a direction substantially perpendicular to the first axis; and means, connected to said displacing means, for actuating said displacing means, responsive to the signal from said sensing and generating means, said displacing means including a first pin extending outwardly from one end of said steering roll, said first pin being positioned eccentrically of the first axis and connected to said actuating means, a connecting member attached to said actuating means and a second pin extending outwardly from the other end of said steering roll, said second pin being positioned eccentrically of the first axis, said second pin, attached to said connecting member, being adapted to rotate in a direction opposed to that of said first pin in response to said actuating means being actuated.

9. A printing machine as claimed in claim 8, in which said actuating means includes a motor mounted internal to said steering roll, coupled to said first pin with said motor being adapted to rotate said first pin and said connecting member incrementally in opposite directions in response to the signal from said sensing and generating means.

10. An electrophotographic printing machine of the type having an endless photoreceptor belt supported by a plurality of rolls and arranged to move in a predetermined path through a plurality of processing stations disposed therealong, including:

a belt steering roll for supporting said belt, said belt steering roll being adapted for rotational movement about a first axis and tilting movement about a second axis transverse to the first axis;

means for sensing movement of the belt in a direction substantially normal to the predetermined path and generating a signal indicative thereof;

means, responsive to the signal generated by said sensing and generating means, for tilting said steering roll about the second axis, to return the belt to the predetermined path, said tilting means being disposed internally within said steering roll, said tilting means comprising means for displacing an end of said steering roll in a direction substantially perpendicular to the first axis;

means, connected to said displacing means, for actuating said displacing means, responsive to the signal from said sensing and generating means, said displacing means includes a first pin extending outwardly from one end of said steering roll, said first pin being positioned eccentrically of the first axis and connected to said actuating means, a connecting member attached to said actuating means and a second pin extending outwardly from the other end of said steering roll, said second pin being positioned eccentrically of the first axis, said second pin, attached to said connecting member, being adapted to rotate in a direction opposed to that of said first pin in response to said actuating means being actuated, said actuating means including a motor mounted internal to said steering roll, coupled to said first pin with said motor being adapted to rotate said first pin and said connecting member incrementally in opposite directions in response to the signal from said sensing and generating means;

a first guide supporting said first pin and limiting the movement of said first pin along a first path; and a second guide supporting said second pin and limiting the movement of said second pin to a second path substantially parallel to the first path.

* * * * *